(12) United States Patent
Ruzon et al.

(10) Patent No.: US 7,706,606 B1
(45) Date of Patent: Apr. 27, 2010

(54) FAST, ADAPTIVE COLOR TO GRAYSCALE CONVERSION

(75) Inventors: Mark Ruzon, Mountain View, CA (US); Scott D. Cohen, Sunnyvale, CA (US); Gregg D. Wilensky, San Francisco, CA (US); Martin E. Newell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 825 days.

(21) Appl. No.: 11/591,914

(22) Filed: Nov. 1, 2006

Related U.S. Application Data (60) Provisional application No. 60/810,031, filed on May 31, 2006.

(51) Int. Cl.
*G06K 9/00* (2006.01)

(52) U.S. Cl. .................. 382/162; 382/164; 382/165

(58) Field of Classification Search .............. 382/162, 382/164, 173, 115, 118, 165, 243, 260, 302; 345/589, 426, 593, 611; 358/1.9, 3.03, 3.26; 375/E7.088, E7.201
See application file for complete search history.

(56) References Cited

U.S. PATENT DOCUMENTS 5,675,716 A * 10/1997 Shu ............................ 358/1.9

OTHER PUBLICATIONS

Eismann, K., "Chapter 8: Retouching and Polishing the Image", *Photoshop Restoration and Retouching, Second Edition*, New Riders, Berkeley, CA (2004), pp. 223-269.
Evening, M., "Chapter 8: Dark Room Effects", *Adobe Photoshop CS2 for Photographers*, Focal Press An Imprint of Elsevier, Burlingame, MA (2005), pp. 325-352.
Gooch, A. et al., "Color2Gray: Salience-preserving color removal", *Computer Graphics Proceedings (SIGGRAPH)*, Association for Computing Machinery (2005), pp. 634-639.
Rasche, K. et al, "Detail Preserving Reproduction of Color Images for Monochromats and Dichromats", *IEEE Computer Graphics and Applications*, (May/Jun. 2005), pp. 22-30.
Reddy, S., "On Improving the Performance of the Wallpaper Symmetry Group Classification Algorithm", Tech. Rep. CMU-RI-TR-05-49, Carnegie Mellon, (Oct. 2005), 22 pages.
Ruzon, M. et al., "Fast and adaptive color-to-grayscale conversion", International Conference on Computer Graphics and Interactive Techniques, *ACM SIGGRAPH 2006 Sketches*, Article No. 124 (2006), Boston, Massachusetts, 4 pages.

* cited by examiner

*Primary Examiner*—Anh Hong Do
(74) *Attorney, Agent, or Firm*—Fish & Richardson P.C.

(57) ABSTRACT

Methods and systems, including computer program products, for determining a plurality of color clusters based on a plurality of pixels associated with a color image, the clusters being fewer than the pixels. A grayscale value for each one of a plurality of points in a color space is determined. Each grayscale value is based on a weighted average of target differences between each point and the clusters. Each of the pixels is associated with one or more of the points. A grayscale value for each pixel is identified based on the grayscale value of the associated one or more points.

21 Claims, 8 Drawing Sheets
(1 of 8 Drawing Sheet(s) Filed in Color)

FAST, ADAPTIVE COLOR TO GRAYSCALE CONVERSION

CROSS-REFERENCE TO RELATED APPLICATIONS

This application claims priority to U.S. Patent Application No. 60/810,031, entitled Fast Adaptive Color to Grayscale Conversion, to Mark Ruzon, et al., which was filed on May 31, 2006. The disclosure of the above application is incorporated herein by reference in its entirety.

BACKGROUND

The present disclosure relates to image processing.

Despite the widespread availability of color cameras and color displays, black-and-white imagery is still used in artistic endeavors and in the design of algorithms in image processing and computer vision that require a single value per pixel. Black-and-white printing is also less expensive than color printing. Therefore, the conversion of color images to grayscale images is an interesting problem in many workflows. The goal is to preserve the visual information present in the original image while removing chrominance information.

Typical techniques for preserving visual information while mapping colors to grayscale attempt to preserve the difference between every pair of colors in the color image in the grayscale version of the image. After all differences have been computed, nonlinear minimization is typically done to find the grayscale value for each color that best preserves the color differences.

But such techniques can take a great deal of time to convert large color images and fail to provide an interactive experience to an end user. This is very important because users may not have a clear idea of what the desired output should look like, and many possibilities may need to be examined. Moreover, any color space uses a specific layout of colors that may not be desirable to users. For example, since red and green are opposites in the CIE-Lab color space, only one is commonly favored as being brighter in the grayscale image. Similarly, blue and yellow objects of equal luminance are commonly not both bright. An additional drawback is that such techniques may not allow users to control parameters for processes implementing such techniques.

SUMMARY

In general, one aspect of the subject matter described in this specification can be embodied in a method that includes determining a plurality of color clusters based on a plurality of pixels associated with a color image, the clusters being fewer than the pixels. A grayscale value for each one of a plurality of points in a color space is determined. Each grayscale value is based on a weighted average of target differences between each point and the clusters. Each of the pixels is associated with one or more of the points. A grayscale value for each pixel is identified based on the grayscale value of the associated one or more points. Other embodiments of this aspect include corresponding systems, apparatus, and computer program products.

These and other embodiments can optionally include one or more of the following features. The grayscale values of eight points are interpolated in order to determine a grayscale value for a pixel. Larger clusters are given greater weight in the weighted average of target differences. The color space is CIE L*a*b*. The points represent a subset of points in the color space. The points are a distribution of colors in the color space. Target differences are determined using a generalized sign-bit function. User input is received designating one or more hues in the color image as having a brighter or darker grayscale value. Color components of each point are scaled before determining color differences. A cluster is a set of points in a color space.

Particular embodiments of the invention can be implemented to realize one or more of the following advantages. Clustering is used to reduce the amount of data needed to represent colors in an image. Grayscale values are computed by averaging target differences together rather than using a time-consuming general nonlinear optimization method. A look-up table can be employed to store computed grayscale values, with others found via interpolation. The overall contrast in the image can be enhanced by scaling chrominance values appropriately before determining grayscale values. Users can specify the amount of contrast enhancement. Users can interactively select colors directly in an image and designate them to be brighter or darker in the grayscale version of the image. A generalized sign-bit function allows different angles to arbitrarily be assigned to be positive or negative. The running time for transforming color images to grayscale can be greatly reduced. Differing gray values can be given to colors which have equal luminance.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

A digital image (which for brevity will simply be referred to as an image) does not necessarily correspond to a file. An image may be stored in a portion of a file that holds other images, in a single file dedicated to the image in question, or in multiple coordinated files. An image could also be placed in memory without having to go through a file at all.

Figure 1:
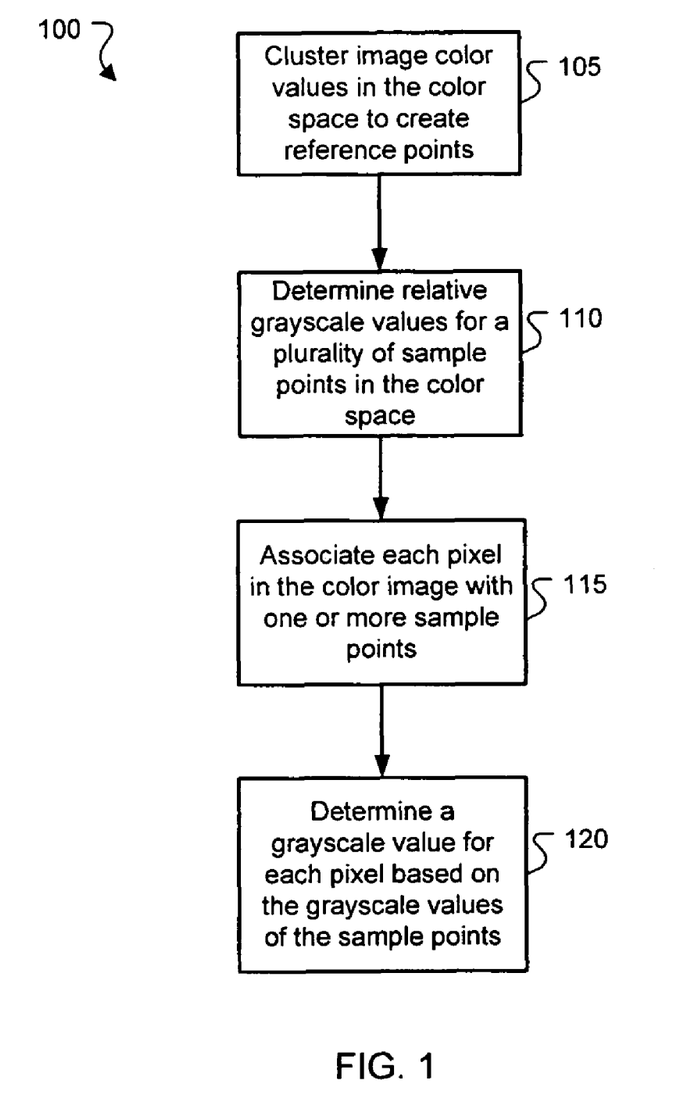
FIG. 1 is a flowchart illustrating a technique for converting a color image to grayscale using target differences.

FIG. 1 is a flowchart illustrating a technique 100 for converting a color image to grayscale using target differences.

The technique 100 maps a color value to a grayscale value for each pixel in the color image (i.e., the color of a pixel is converted to a value representing an intensity). By clustering colors in a color image and calculating relative grayscale values for a sample of points in a color space, color pixels can be converted to grayscale values much faster than existing methods.

Figure 2:
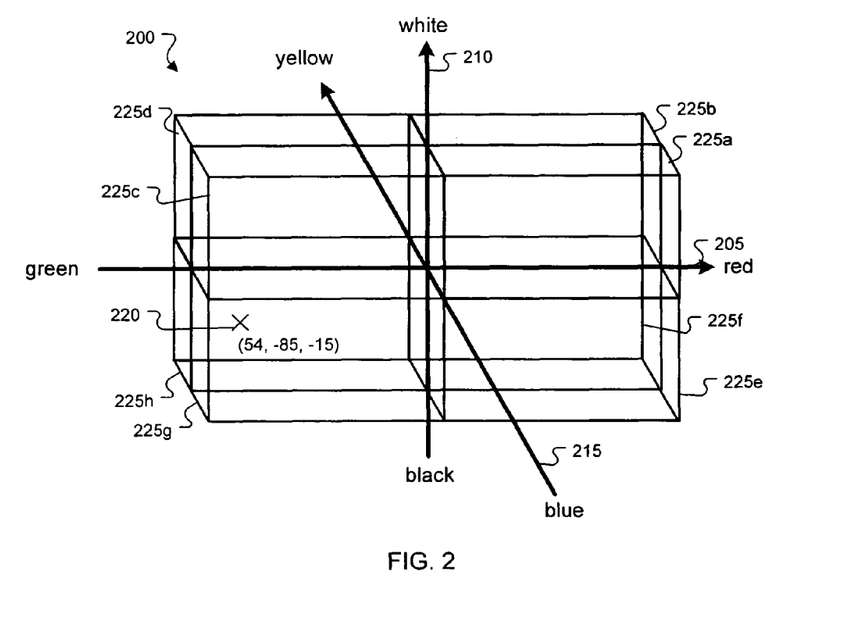
FIG. 2 illustrates an example color space with cluster regions.

The technique 100 begins by clustering image color values in a color space such as CIE-Lab, for example, to create a set of reference points (step 105). In some implementations, a reference point is the centroid of a color cluster. Other color spaces can be used so long as there is a way to compute target differences in those spaces. For example, color spaces that separate luminance and chrominance, such as Hue Saturation Value (HSV) and Hue, Saturation, and Lightness (HSL), could be adapted to this method. As shown in FIG. 2, a color may be represented as a point 220 in the color space 200. As represented by axis 210, the L* dimension represents the luminance of the color (e.g., L*=0 indicates black while L*=100 indicates white). The a* dimension (axis 205) represents a color between red and green (e.g., a large negative a* value indicates green while a large positive a* value indicates red). The b* dimension (axis 215) represents a color between yellow and blue (e.g., a large negative b* value indicates blue while a large positive b* value indicates yellow). As shown, the color is represented in the color space 200 by coordinates L*a*b* (54, −85, −15), meaning the color 220 is a moderately bright bluish shade of green.

As shown in FIG. 2, the color space 200 is divided into eight cuboids or cluster "bins" 225a-h. Bins are used to count or "cluster" colors from a color image. Any number of bins are possible and the bins can have different shapes. In certain implementations, there are more bins along the L* dimension than along the chrominance dimensions because the human eye is more sensitive to changes in luminance. In one implementation, luminance values are divided into 32 intervals, and the two chrominance values are divided into 8 intervals each, for a total of 32×8×8=2048 bins. Each pixel in the color image has a location in the color space (e.g., 220) that maps to a single bin (e.g., 225g). Each pixel in the color image can be viewed as causing a counter associated with the cluster bin in which the pixel is located to be incremented. In this way, the distribution of colors in the image can be determined in a histogram fashion.

Relative grayscale values for a sample of evenly-spaced points in a color space are then determined (step 110). In certain implementations, the sample of points is chosen by taking the Cartesian product of a set of evenly spaced values along each dimension. For each sample point in the color space for which a grayscale value is desired, the weighted average of the target distances between the sample point and each reference point is determined where in one implementation the weight is based on the number of colors in a bin. (See FIG. 3 and the accompanying discussion.) Bins having more colors have a greater weight. In certain implementations, because bins with a small weight have a negligible impact on the weighted average, these bins can be omitted from the determination of grayscale values for increased computation speed. For example, bins having a number of pixels less than 0.1% of the total number of pixels in the color image can be omitted.

Each pixel in the color image is associated with one or more sample points (e.g., eight) in the color space for which a grayscale value has been explicitly determined (step 115) and the grayscale value for the pixel is determined based on the one or more sample points (step 120). If a given pixel in the color image corresponds directly to a sample point (i.e., the grayscale value for that pixel's color has been explicitly computed), the grayscale value of the sample point is used. Otherwise, a linear interpolation of the grayscale values between the closest sample points (e.g., eight) is used. Examples of techniques for determining a grayscale value for each pixel in the color image are described with reference to FIGS. 3-4.

In certain implementations, a target difference ($\delta_{ij}$) between a point i in the color space and a reference color j is used to determine grayscale values for the point i. The target difference represents the signed difference between color i and color j when mapped to their respective grayscale values. Given two points $(L_i, a_i, b_i)$ and $(L_j, a_j, b_j)$ in the color space 200, the luminance difference ($\Delta L_{ij}=L_i-L_j$) can be determined. Also, the chrominance differences can be determined using differences in the CIE-Lab a* dimension ($\Delta a_{ij}=a_i-a_j$) and the CIE-Lab b* dimension ($\Delta b_{ij}=b_i-b_j$). To determine a target difference between the two points, the following formulas may be used:

$\theta_{ij}$=arctan 2($\Delta b_{ij}$, $\Delta a_{ij}$), where arctan 2(y, x) is the angle whose tangent is y/x and which lies in the appropriate quandrant.

$$s = \begin{cases} +1 & \text{if } d(\theta_{ij}, \theta) \le 90° \\ -1 & \text{otherwise} \end{cases} \quad (1)$$

$$\Delta C_{ij} = \alpha \tanh\left(\sqrt{\Delta a_{ij}^2 + \Delta b_{ij}^2}\Big/\alpha\right)(\alpha > 0)$$

$$\delta_{ij} = \begin{cases} \Delta L_{ij} & \text{if } |\Delta L_{ij}| > |\Delta C_{ij}| \\ s\Delta C_{ij} & \text{otherwise} \end{cases} \quad (2)$$

The quantities $\alpha$ and $\theta$ are user-defined parameters. The quantity $\alpha$ is used to select between chrominance differences and luminance differences. For example, when $\alpha$ is small, the luminance differences will usually be larger than the chrominance differences. When $\alpha$ is large, the chrominance differences will usually be larger than the luminance differences. The quantity $\theta$ divides the chrominance plane and determines whether color i will be brighter or darker than color j in the case where their luminance values are similar. The term $d(\theta_{ij}, \theta)$ is the distance between two angles; $\theta_{ij}$ is the angle of a vector from (0,0) to ($\Delta a_{ij}, \Delta b_{ij}$) with respect to the positive $\Delta a$ axis. To determine $d(\theta_{ij}, \theta)$, the smaller angle is subtracted from the larger angle. If this difference is less than or equal to 180°, that is the result. Otherwise, 360° minus the difference is the answer. For example, if $\theta$=45°, warmer reds and yellows may have mostly positive differences when compared to cooler greens and blues and be mapped to brighter grayscale values.

Figure 3:
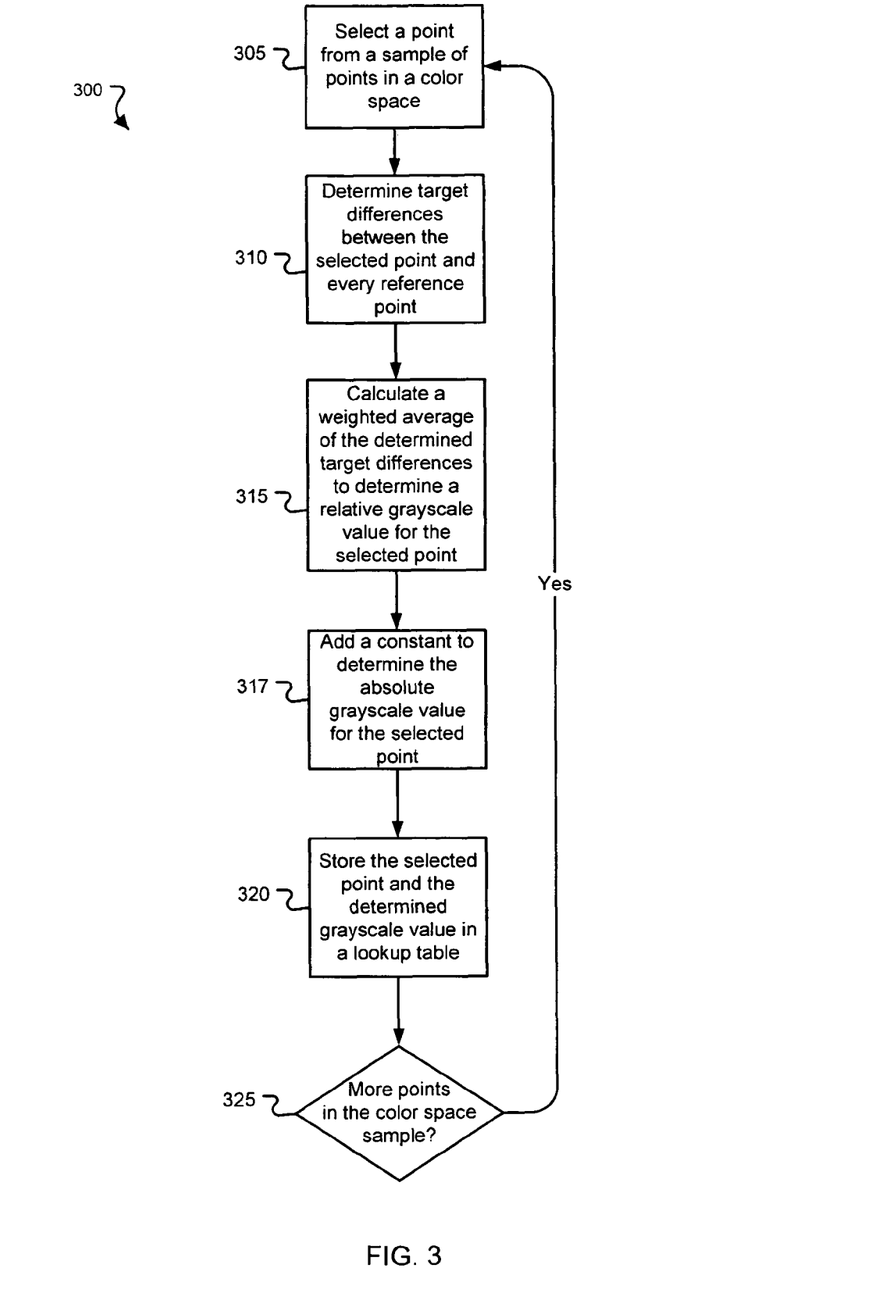
FIG. 3 is a flowchart illustrating a technique for computing grayscale values for a set of colors sampled from a color space.

FIG. 3 is a flowchart illustrating a technique 300 for computing grayscale values for a set of colors sampled from a color space. The technique 300 begins by selecting a point from a sample of points in a color space, such as the color space 200 (step 305). Next, a target difference between the selected sample point and every reference point is determined (step 310). Then, a weighted average of the determined target differences is used to obtain a grayscale value for the selected point (step 315).

Considering the relationship $g_i-g_j=\delta_{ij}$, an energy function relating all grayscale values, $g_i$, can be described as:

$$E(g) = \sum_{i=1}^{n} \sum_{j=1}^{n} (g_i - g_j - \delta_{ij})^2 \quad (3)$$

By setting the partial derivative of E(g) with respect to some reference point $g_k$ to zero, the following solution can be derived:

$$\frac{\partial E}{\partial g_k} = 0 \Rightarrow \sum_{j=1}^{n}(g_k-g_j-\delta_{kj}) = \sum_{i=1}^{n}(g_i-g_k-\delta_{ik}) \quad (4)$$

$$\Rightarrow g_k = \frac{1}{n}\sum_{i=1}^{n} g_i + \frac{1}{2n}\sum_{i=1}^{n}(\delta_{ki}-\delta_{ik}) \quad (5)$$

The first term is the mean $g_i$, which can be set to any reasonable constant such as the mean luminance of the input image, for example. The second term is an averaging of forward and reverse differences. When the $\delta_{ik}$ are anti-symmetric ($\delta_{ki}=-\delta_{ik}$), the formula can be further reduced to:

$$\Rightarrow g_k = \frac{1}{n}\sum_{i=1}^{n} g_i + \frac{1}{n}\sum_{i=1}^{n} \delta_{ik} \quad (5.5)$$

In other words, the optimal value for $g_k$ relative to its neighbors is the weighted average difference between it and all reference colors. This insight is key to speeding up the algorithm because it avoids an optimization over all pixels in the image. Reducing the computation to averaging means that the final mapping will be dominated by those colors that appear most often in the image, and that noise and variations should have little effect on the output. Therefore, if the dominant colors and the number of pixels that have that color are known, the number of reference colors can be reduced while effectively using most of the image, further speeding up the computation. The final grayscale value is then the sum of the mean input luminance and the relative grayscale value (step 317).

A lookup table or other data structure can be used to store the determined grayscale value for the selected point for future reference (step 320). Next, it is determined whether there are more points in the color space sample (step 325). If so, then the process begins again at step 305.

Figure 4A:
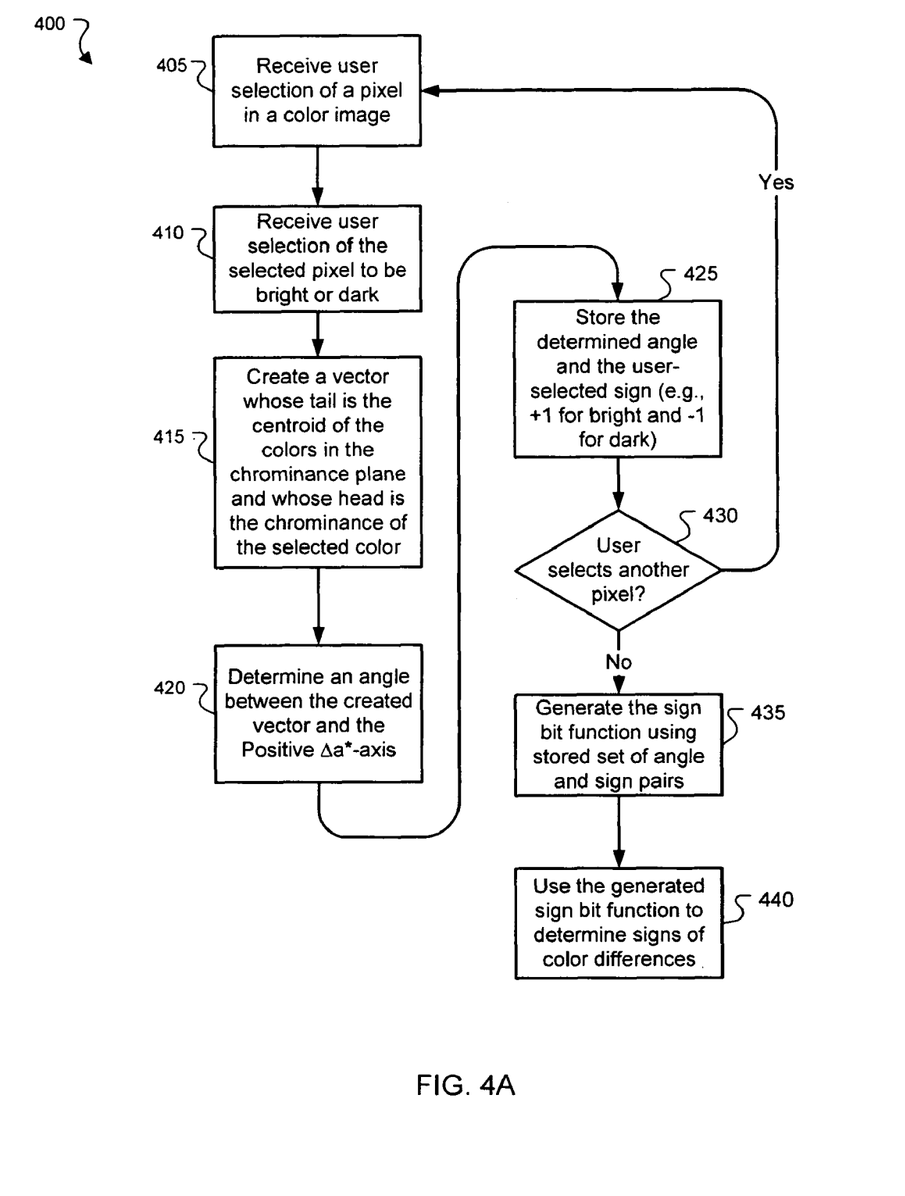
FIG. 4A is a flowchart illustrating a technique for determining the sign of a target difference.
Figure 4B:
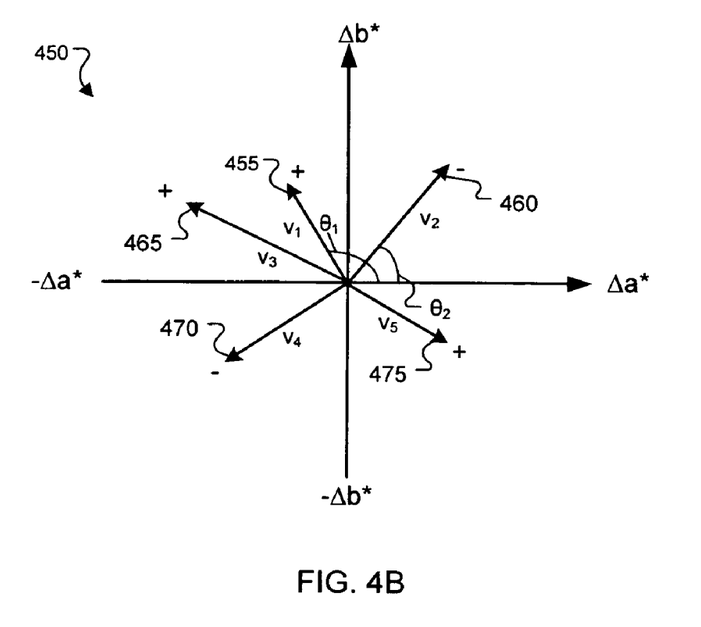
FIG. 4B shows an example of a color difference space generated based on user inputs.

FIGS. 4A-B collectively illustrate a technique 400 for determining the sign of a target difference $\delta_{ij}$. As described in the equation (2), the sign of a target difference between two colors may depend on the sign of a chrominance difference between the two colors when the magnitude of the chrominance difference is greater than the magnitude of the luminance difference between the two colors. Using the illustrated technique, a sign bit s in equation (1) can be determined to indicate a sign for a chrominance difference between two colors.

In various implementations, the sign bit for any target difference $\delta_{ij}$ can be computed based on a set of angle and sign pairs such as the set $\{(\theta_1, s_1), (\theta_2, s_2), \ldots, (\theta_m, s_m)\}$, where $s_i$ is the sign bit associated with angle $\theta_i$. In one implementation, the sign bit for any $\delta_{ij}$ where $|\Delta L_{ij}| \leq |\Delta C_{ij}|$ is:

$$k' = \arg\min_{1 \leq k \leq m} d(\theta_{ij}, \theta_k) \quad (6)$$
$$s = s_{k'}$$

In certain implementations, user-selected parameters may be used for determining sign bits for target differences. For example, a user may be prompted to select colors in the image and to designate the hues corresponding to the selected colors as being brighter or darker in a corresponding grayscale image. A hue that the user wishes to become bright in the resulting grayscale image is assigned a positive sign bit, while a hue that is to become dark is assigned a negative sign bit. Allowing the user to select hues in the image allows a more flexible color to grayscale mapping by generating general square waves that oscillate irregularly between positive and negative.

FIG. 4A is a flow chart illustrating a technique 400 for determining a sign for target differences $\delta_{ij}$. The technique 400 begins with receiving a user selection of a pixel in a color image (step 405). Next, a user selection of the selected pixel to be bright or dark is received (step 410). In one implementation, steps 405 and 410 can occur simultaneously. For example, a graphical user interface can allow users to click on a color while possibly holding down a keyboard modifier to indicate a negative sign bit.

As shown in FIG. 4B, an exemplary color difference space 450 includes a point 455 representing a user-selected pixel in a color image. A user has selected the point 455 to be bright (+). In another example, the color space 450 includes a point 460 representing a user selected pixel in a color image, and the point 460 is selected to be dark (−).

A vector is created whose tail is the centroid of the chrominance values of all colors in the image and whose head is the chrominance of the selected color (step 415). For example, vector $v_1$ is created for the point 455 and a vector $v_2$ is created for the point 460 in FIG. 4B. An angle between the created vector and the positive $\Delta a^*$-axis is determined (step 420). For example, in FIG. 4B, angle $\theta_1$ is determined between $v_1$ and the $\Delta a^*$-axis. The determined angle and the user-selected sign associated with the pixel are stored (step 425). For the points 455, 460 in FIG. 4B, a set with pairs $\{(\theta_1, +1), (\theta_2, -1)\}$ is established.

If the user selects another pixel in the color image, then the step 405 is repeated (step 430). For example, the user may also select points 465, 470 and 475 to define vectors $v_3$, $v_4$, and $v_5$. If the user does not select another pixel, then a sign bit function is generated using the stored set of angle and sign pairs (step 430) which can be used to determine the signs of color differences (step 440). For an arbitrary vector constructed while computing $\delta_{ij}$, the nearest $\theta_i$ to the angle associated with this vector determines the sign bit.

Figure 5A:
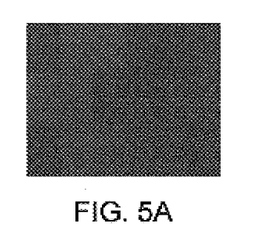
FIGS. 5A-E show an example of a color image and corresponding grayscale images of the color image using different sign-bit functions.
Figure 5B:
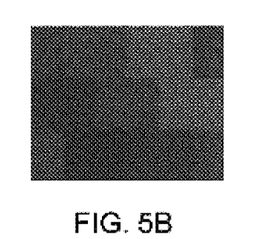
Figure 5C:
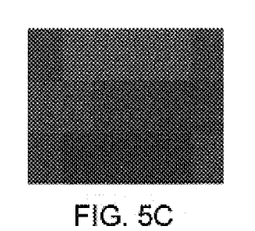
Figure 5D:
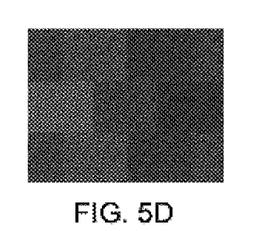
Figure 5E:
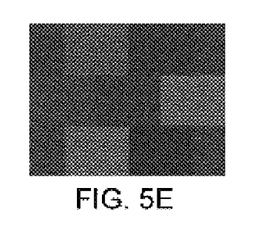

FIG. 5A shows a color image and FIGS. 5B-E show corresponding grayscale versions of the color image in FIG. 5A as effected by different sign-bit functions. FIG. 5A is a constant-luminance image with rectangles of different colors. The colors are spatially arranged as they appear in color space 200 and are roughly 20 units both from the gray background and from each other. Using a prior art sign-bit function that only has a single value for θ, a user can choose a number of different ways to partition the rectangles among light and dark, such as shown in FIGS. 5B-D where the lighter rectangles are on one side in the direction of the θ parameter, while the darker rectangles are on the opposite side. The result in FIG. 5E was created using the technique 400 by assigning alternating sign bits to adjacent colors.

Figure 6:
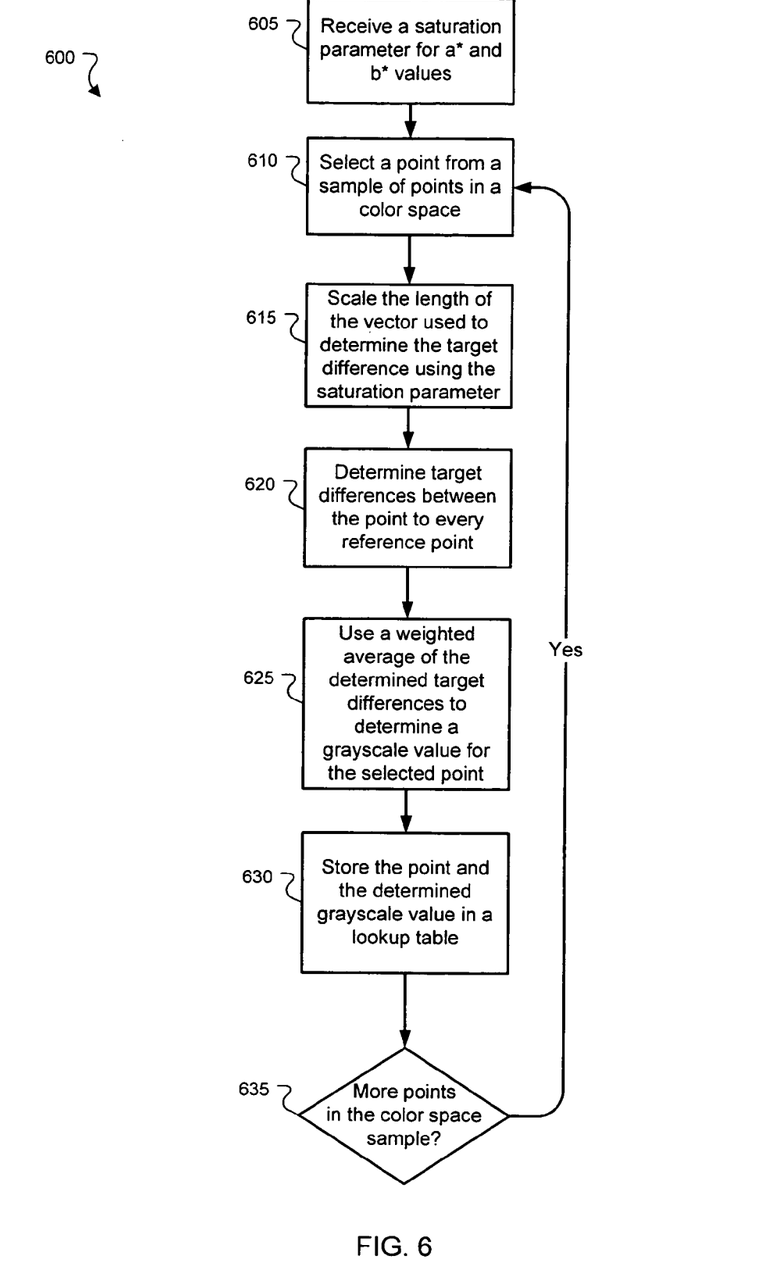
FIG. 6 is a flowchart illustrating a technique for performing contrast enhancement of a grayscale image.

FIG. 6 is a flowchart illustrating a technique 600, an elaboration of the technique 300, for performing contrast enhancement of a grayscale image. In certain implementations, a user interface (e.g., a slider bar) may be provided so that a user can adjust the contrast level in the grayscale image by adjusting the values in the lookup table. The received saturation parameters can increase magnitude of the target differences and thus the range of grayscale values in a resulting image. The technique 600 begins with receiving a saturation parameter for a* and b* values (step 605). Next, a point from a sample of points in a color space is selected (step 610). For example, a point may be chosen from an evenly spaced set of points in a color space. Using the received saturation parameters, the a* and b* components of the point are scaled (step 615).

Target differences between the scaled point and every reference point are determined (step 620). A weighted average of the determined target differences is used to determine a grayscale value for the selected point (step 625). Next, the point and the determined grayscale is stored in a lookup table (step 630). If there are more points in the color space sample (step 635), the step 610 is repeated. Using the updated grayscale values in the lookup table, new grayscale values can be computed for a color image (e.g., using operations illustrated with reference to FIG. 1) for each pixel in the color image. The contrast of the resulting grayscale image can be enhanced due to larger chrominance differences between colors.

Figure 7:
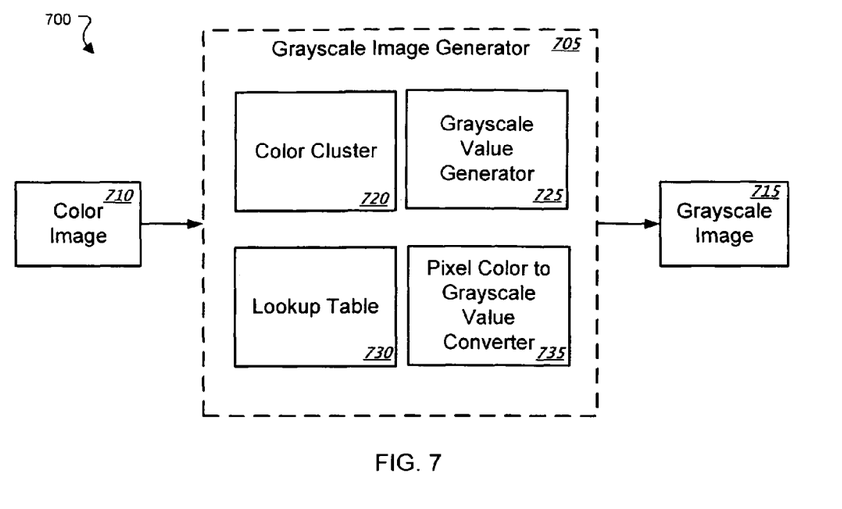
FIG. 7 is an illustration of an exemplary system for converting color images to grayscale.

FIG. 7 is an illustration of a system 700 for converting color images to grayscale images. The system 700 includes a grayscale image generator 705. The grayscale image generator 705 receives a color image 710 and converts the color image 710 to a grayscale image 715. The grayscale image generator 705 determines a grayscale value for each pixel by mapping the points in the color image 710 to grayscale values.

The grayscale image generator 705 includes a color cluster component 720, a grayscale value generator component 725, a lookup table component 730, and a pixel color to grayscale value converter component 735. The color cluster component 720 clusters colors in the color image 710 into logical color space bins, such as the bins 225a-h and creates reference points. The relative grayscale value generator component 725 determines a grayscale value for each of a set of evenly spaced sample points. For each point in the sample, the grayscale value generator 725 determines a weighted average of target differences (e.g., target differences determined using the techniques 300, 400, and 600) between a point in the sample and the reference points. For example, the relative grayscale value generator 725 may count the number of pixels whose color corresponds to a given reference point and assign a greater weight to reference points with higher numbers of pixels mapped to them. In certain implementations, the grayscale value generator 725 can omit bins having a number of pixels less than a threshold proportion (e.g., 0.1%) of the total number of pixels in the color image. Using the determined weighted average of the distances, the grayscale value generator 725 stores each point in the sample and its associated grayscale value in the lookup table 730. The pixel color to grayscale value converter 735 uses the lookup table 730 to associate each pixel in the color image 710 with one or more of the sample points and determines, based on the associated sample points, a grayscale value for each of the pixels.

In certain implementations, the system 700 can include a user interface for a user to designate pixels in the color image 710 to be bright or dark in the grayscale image 715. The user interface can also include a mechanism (e.g., a graphical slider bar) for allowing users to enhance the contrast of the grayscale image 715, as described above.

The system 700 can be implemented with fewer or more components. Moreover, the components can be resident on one or more computing devices connected by one or more public or private networks, or other suitable communication means.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately of in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The invention can be applied to video images. The color clusters in this case can be determined one frame at a time, treating each frame as a separate image. Alternatively, the color clusters can be determined from multiple frames. The invention can be applied to 3D images, for which a voxel is treated as a pixel. The invention can be applied to vector graphics, for which each vector graphic element is treated as a pixel in the invention with a weight which could be taken to be proportional to the element's area or perimeter and for which the element color is treated as a pixel color in the invention.

What is claimed is:

1. A computer-implemented method, comprising:
   determining, by computer, a plurality of color clusters based on a plurality of pixels associated with a color image, the clusters being fewer than the pixels;
   determining, by the computer, a grayscale value for each one of a plurality of points in a color space, each grayscale value based on a weighted average of target differences between each point and the clusters;
   associating, by the computer, each of the pixels with one or more of the points; and
   identifying, by the computer, a grayscale value for each pixel based on the grayscale value of the associated one or more points.

2. The method of claim 1, where the identifying further includes:
   interpolating grayscale values of eight points in order to determine a grayscale value for a pixel.

3. The method of claim 1, where:
   larger clusters are given greater weight in the weighted average of target differences.

4. The method of claim 1, where:
   the color space is CIE L*a*b*.

5. The method of claim 1, where:
   the points represent a subset of points in the color space.

6. The method of claim 1, where:
   the points are a distribution of colors in the color space.

7. The method of claim 1, further comprising:
   determining the target differences using a generalized sign-bit function.

8. The method of claim 7, further comprising:
   receiving user input designating one or more hues in the color image as having a brighter or darker grayscale value.

9. The method of claim 1, further comprising:
   scaling color components of each point before determining color differences.

10. The method of claim 1, where:
    a cluster is a set of points in a color space.

11. A computer program product, encoded on a computer-readable medium, operable to cause data processing apparatus to perform operations comprising:

determining a plurality of color clusters based on a plurality of pixels associated with a color image, the clusters being fewer than the pixels;

determining a grayscale value for each one of a plurality of points in a color space, each grayscale value based on a weighted average of target differences between each point and the clusters;

associating each of the pixels with one or more of the points; and identifying a grayscale value for each pixel based on the grayscale value of the associated one or more points.

12. The program product of claim 11, where the identifying further includes:

interpolating grayscale values of eight points in order to determine a grayscale value for a pixel.

13. The program product of claim 11, where:

larger clusters are given greater weight in the weighted average of target differences.

14. The program product of claim 11, where:

the color space is CIE L*a*b*.

15. The program product of claim 11, where:

the points represent a subset of points in the color space.

16. The program product of claim 11, where:

the points are a distribution of colors in the color space.

17. The program product of claim 11, further comprising:

determining the target differences using a generalized sign-bit function.

18. The program product of claim 17, further comprising:

receiving user input designating one or more hues in the color image as having a brighter or darker grayscale value.

19. The program product of claim 11, further comprising:

scaling color components of each point before determining color differences.

20. The program product of claim 11, where:

a cluster is a set of points in a color space.

21. A system comprising:

means for determining a plurality of color clusters based on a plurality of pixels associated with a color image, the clusters being fewer than the pixels;

means for determining a grayscale value for each one of a plurality of points in a color space, each grayscale value based on a weighted average of target differences between each point and the clusters;

means for associating each of the pixels with one or more of the points; and means for identifying a grayscale value for each pixel based on the grayscale value of the associated one or more points.

* * * * *